United States Patent
Uestuenel

(10) Patent No.: US 12,195,004 B2
(45) Date of Patent: Jan. 14, 2025

(54) METHOD FOR DETERMINING THE CURRENT ANGLE OF LATERAL INCLINATION OF A ROADWAY

(71) Applicant: Valeo Schalter und Sensoren GmbH, Bietigheim-Bissingen (DE)

(72) Inventor: Eser Uestuenel, Bietigheim-Bissingen (DE)

(73) Assignee: VALEO SCHALTER UND SENSOREN GMBH, Bietigheim-Bissingen (DE)

(*) Notice: Subject to any disclaimer, the term of this patent is extended or adjusted under 35 U.S.C. 154(b) by 234 days.

(21) Appl. No.: 17/792,833

(22) PCT Filed: Dec. 16, 2020

(86) PCT No.: PCT/EP2020/086341
§ 371 (c)(1),
(2) Date: Jul. 14, 2022

(87) PCT Pub. No.: WO2021/144105
PCT Pub. Date: Jul. 22, 2021

(65) Prior Publication Data
US 2023/0041499 A1 Feb. 9, 2023

(30) Foreign Application Priority Data
Jan. 16, 2020 (DE) .................. 10 2020 100 943.7

(51) Int. Cl.
*B60W 40/00* (2006.01)
*B60W 40/072* (2012.01)
*B60W 40/076* (2012.01)
*B60W 50/14* (2020.01)

(52) U.S. Cl.
CPC ........ *B60W 40/072* (2013.01); *B60W 40/076* (2013.01); *B60W 50/14* (2013.01); *B60W 2420/403* (2013.01)

(58) Field of Classification Search
CPC .. B60W 40/072; B60W 40/076; B60W 50/14; B60W 2420/403; B60W 2520/28; B60W 40/00
See application file for complete search history.

(56) References Cited

U.S. PATENT DOCUMENTS 5,710,704 A * 1/1998 Graber ................ B60W 10/184
701/72
6,816,804 B1 * 11/2004 Lee ..................... B60W 40/105
701/72

(Continued)

FOREIGN PATENT DOCUMENTS

EP 0901929 B1 11/2003
JP H10-31798 A 2/1998

(Continued)

OTHER PUBLICATIONS

Office Action Issued in Corresponding JP Application No. 2022-543403, dated Oct. 3, 2023. (19 pages with English Translation).

*Primary Examiner* — Yonel Beaulieu
(74) *Attorney, Agent, or Firm* — Osha Bergman Watanabe & Burton LLP

(57) ABSTRACT

The present invention relates to a method for determining the current angle of lateral inclination (a) of a roadway by means of a vehicle, at least comprising the steps of: a) determining the current radius of curvature (K) of the roadway; b) measuring the current velocities v(1,2) of at least two different wheels of the vehicle, one of the wheels with the velocity v(1) lying closer to the current curve center point of the roadway; c) calculating the current radius of lateral inclination (Q) of the roadway using the current wheel velocity v(1), the wheel distance (d) and the difference between the wheel velocities measured in method step b); d) calculating the current angle of inclination (a) of the vehicle on the roadway using the quotient of the radius of (Continued)

Figure 1:
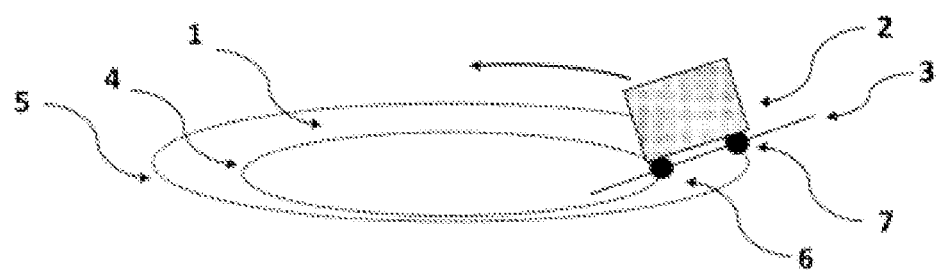

curvature (K) determined in method step a) and the current radius of lateral inclination (Q) calculated in method step c). The present invention further relates to the use of the method to monitor and/or control a vehicle, to a driver assistance system designed to carry out the method according to the invention, and to a vehicle having such a driver assistance system.

10 Claims, 2 Drawing Sheets

(56) References Cited

U.S. PATENT DOCUMENTS

| | | | |
|---|---|---|---|
| 7,437,230 | B2 | 10/2008 | McClure et al. |
| 2007/0027582 | A1* | 2/2007 | Munnix .................. B60T 8/172 |
| | | | 701/1 |
| 2012/0173083 | A1* | 7/2012 | Hsu ..................... B60T 8/17554 |
| | | | 701/45 |
| 2018/0037082 | A1* | 2/2018 | Unger ............... B60G 17/01908 |
| 2022/0348116 | A1* | 11/2022 | Fukuyama ............. B60N 2/026 |
| 2023/0192085 | A1* | 6/2023 | Woo .................. B60W 50/0097 |
| | | | 701/22 |

FOREIGN PATENT DOCUMENTS

| | | |
|---|---|---|
| JP | H10-103935 A | 4/1998 |
| JP | 2004-294142 A | 10/2004 |
| JP | 2008-256577 A | 10/2008 |
| JP | 2019-111988 A | 7/2019 |
| JP | 2019-172220 A | 10/2019 |

* cited by examiner

METHOD FOR DETERMINING THE CURRENT ANGLE OF LATERAL INCLINATION OF A ROADWAY

The present invention relates to a method for determining the current angle of lateral inclination a of a roadway by means of a vehicle, at least comprising the steps of:

a) determining the current radius of curvature K of the roadway;

b) measuring the current velocities v(1,2) of at least two different wheels of the vehicle, one of the wheels with the velocity v(1) lying closer to the current center of the curve on the roadway;

c) calculating the current radius of lateral inclination Q of the roadway on the basis of the current wheel velocity v(1), the wheel distance d and the difference between the wheel velocities measured in method step b);

d) calculating the current angle of inclination a of the vehicle on the roadway using the quotient of the radius of curvature K determined in method step a) and the current radius of lateral inclination Q calculated in method step c). The present invention also relates to the use of the method for monitoring and/or controlling a vehicle, to a driver assistance system designed to carry out the method according to the invention and to a vehicle with such a driver assistance system.

Automation in the vehicle sector has become increasingly important in recent years. This development is based not least on ever greater advances in the field of sensor technology, as well as the possibility of being able to process large amounts of data at ever greater velocities. While in the past the focus of development was on the technical possibilities of the individual system, today there is an ever increasing proliferation of more complex technical solutions that allow a more complete picture of current driving situations to be obtained by a combination of different sensors or by specifically chosen data processing. The latter category ensures in particular safer driving, and also safer autonomous driving, since a more precise image of the vehicle environment can be created by using different data sources.

One possibility for controlling a vehicle is described for example in U.S. Pat. No. 7,437,230 B2. This discloses a method for controlling an agricultural vehicle, comprising: receiving global positioning system (GPS) data including position and velocity information corresponding to at least a position, velocity and course of the vehicle; receiving a yaw rate signal; and calculating an adjusted course, the adjusted course comprising a blend of the yaw rate and the course information based on the GPS data. For each planned track with a variety of planned positions and planned directions, the method comprises: calculating the actual track and the corresponding error in relation to the planned track and, based on the adjusted course and the adjusted position; calculating a desired radius of curvature to achieve the planned track; and generating a control command based on the planned radius of curvature and forwarding the control command to a steering mechanism, the steering mechanism being configured to control the vehicle.

Another method for monitoring driving maneuvers of a vehicle is specified in EP 0 901 929 B1. The vehicle maneuver control device for a vehicle has the following:

a roadway surface-friction-coefficient estimating unit for estimating current values of the friction coefficient of the roadway surface;

a roadway inclination estimating unit for estimating current values of the inclination of the roadway (SL);

a curve detecting device for detecting a curve of a roadway and calculating curve data including a distance between the vehicle and the curve and a physical quantity indicating a degree of the curve;—an allowable deceleration presetting device for presetting the allowable deceleration at which the vehicle can travel considering the roadway conditions;

an allowable lateral-acceleration presetting device for presetting the allowable lateral acceleration at which the vehicle can travel considering the roadway conditions;

an allowable approach-velocity presetting device for presetting an allowable approach velocity at which the vehicle can approach the curve on the basis of a physical quantity and the allowable lateral acceleration; and a deceleration assessment-velocity calculating device, which is designed to calculate a deceleration assessment velocity on the basis of the distance, the allowable deceleration velocity and the allowable approach velocity to assess whether a current velocity at which the vehicle is traveling should be reduced; characterized in that the allowable approach-velocity presetting device is designed in such a way that it presets an allowable approach velocity at which the vehicle can approach the curve on the basis of the current friction coefficient of the roadway and the radius of curvature of the curve, the approach velocity being determined by the current value of the inclination of the roadway (SL), the friction coefficient being obtained by comparing a yaw angle response on the basis of an equation of vehicle motion and an actual yaw angle, and the preset allowable approach velocity being updated when a rate of change of the friction coefficient exceeds a given value, the inclination of the roadway (SL) being calculated on the basis of a longitudinal acceleration obtained from a longitudinal acceleration sensor and a rate of change of a current vehicle velocity for each target time point, and the preset allowable approach velocity being updated when a rate of change of the inclination of the roadway exceeds a given value, in that a warning assessment-velocity calculating device (29) is designed to calculate a warning assessment velocity on the basis of the distance, the preset allowable deceleration velocity and the preset allowable approach velocity to assess whether a warning should be given to the driver, and in that a warning device is designed to warn the driver when the current velocity is higher than the warning assessment velocity.

Such solutions known from the prior art can still have further potential for improvement, in particular with regard to the use of different data sources for the rapid and reproducible detection of the current environmental status.

It is the object of the present invention to at least partially overcome the disadvantages known from the prior art. In particular, the object of the present invention is to provide a solution by means of which the current road situation, and here in particular the angle of lateral inclination of the road, can be recognized quickly and reliably.

The object is achieved according to the invention by a method having the features disclosed herein. The object is also achieved according to the invention by using the disclosed method as part of a routine for monitoring or controlling a vehicle, a driver assistance system, and a vehicle with a driver assistance system according to the invention. Preferred embodiments of the invention are described in the dependent claims, in the description or the figures, further features described or shown in the dependent claims or in the description or the figures being able to represent subject matter of the invention individually or in any combination, unless the context clearly indicates the opposite.

According to the invention, a method for determining the current angle of lateral inclination α of a roadway by means of a vehicle is proposed, the method comprising at least the steps of:

a) determining the current radius of curvature K of the roadway;

b) measuring the current velocities v(1,2) of at least two different wheels of the vehicle, one of the wheels with the velocity v(1) lying closer to the current center of the curve on the roadway;

c) calculating the current radius of lateral inclination Q of the roadway on the basis of the current wheel velocity v(1), the wheel distance d and the difference between the wheel velocities measured in method step b);

d) calculating the current angle of inclination a of the roadway using the quotient of the radius of curvature K determined in method step a) and the current radius of lateral inclination Q calculated in method step c).

Such a method can have significant advantages over the solutions from the prior art, in particular with regard to the velocity and accuracy in determining the current angle of lateral inclination of a roadway. Advantageously, the method can determine both the lateral inclination of the roadway and, via the lateral inclination of the roadway, the lateral inclination of the vehicle. Due to the fact that only two classes of parameters are used for determining the angle, the radius of curvature of the road and the wheel velocities, the angle of inclination can be determined with a high frequency. In this respect, in addition to the angle of inclination as such, a rapid change of the angle of inclination of the roadway can also be detected, which quickly and reliably indicates unwanted or potentially dangerous road conditions. This information can advantageously be used by this or other systems as an input for stabilizing and monitoring the vehicle. The result is thus a robust and cost-effective method that can be optimally based on existing sensors and provide further information on safe and also autonomous driving. Compared to the previous technical alternatives, this solution therefore offers the advantage that the number of additional and expensive sensors, such as for example acceleration sensors and gyro sensors and their complex wiring, can be reduced. In particular, the method can for example contribute to assisting lane control or generally to stabilizing a vehicle trajectory, even on steeply inclined roadways.

The method according to the invention determines the current angle of lateral inclination α of a roadway by means of a vehicle. The angle of lateral inclination of the roadway is thus calculated or determined using measurement data from a vehicle. The current measurement data are included in the determination as a calculation variable and the current state of the roadway at the location of the vehicle or the current inclination of the roadway is thus mapped using the method according to the invention. Using the method, the current angle of lateral inclination of the vehicle can also be additionally obtained indirectly. The latter applies in particular when both wheels of the vehicle are in contact with the roadway without the vehicle undergoing any swiveling movements of its own. In these cases, the angle of lateral inclination of the vehicle and the angle of lateral inclination of the roadway match. Vehicles may in this case be in particular engine-driven motor vehicles such as passenger cars, buses or trucks. Paved roads such as city streets, country roads or freeways come into consideration in particular as roadways. The method according to the invention is suitable for determining the angle of lateral inclination of roadways and in particular for determining the angle of lateral inclination of tight curves, which usually have a greater angle of lateral inclination than straight roads.

The angle of lateral inclination a of a roadway is a function of the difference in height between the left edge and the right edge of the roadway. This angle of lateral inclination is schematically shown further back in the figures. A lateral inclination of a roadway and thus also an angle of lateral inclination is intentional, since roadways are usually provided with a lateral gradient of a greater or lesser degree, for example in order to facilitate the drainage of rainwater. Just like the angle of lateral inclination of a roadway, the angle of lateral inclination of a vehicle results from the lateral difference in height between the right side and the left side of the vehicle. Of course, great angles of lateral inclination can affect the driving dynamics of the vehicle and lead to safer driving situations, in particular when cornering quickly.

In method step a), the current radius of curvature K of the roadway is determined. The radius of curvature of a roadway is a measure of the deviation of a section of roadway from a straight line. The radius of curvature is anti-proportional to the curvature of the roadway and can be obtained for example by fitting a circle to a two-dimensional projection of the current section of the roadway. If the roadway is essentially straight, i.e. not curved or uncurved, the adjustment is made by a circle with a large radius, since sectors of circles with large radii tend to form "straight" sections. If the roadway is greatly curved, for example in the form of a tight curve, the current section of roadway can be approximated by means of a circle with a small radius. The two-dimensional projection of the roadway is obtained for example by means of a map display or from a two-dimensional projection of satellite data. These representations provide quantitative 2D information, i.e. whether the road is straight, curves to the right or to the left, and the radii of curvature of the sections under consideration can be extracted or calculated from the course of the road. However, the radius of curvature can also be obtained using other known mathematical methods for the quantitative determination of curvatures, for example on 2D GPS data.

In method step b), the current velocities v(1,2) of at least two different wheels of the vehicle are measured, one of the wheels with the velocity v(1) lying closer to the current center of the curve on the roadway. The current wheel velocities of the vehicle are therefore included in the determination of the angle of lateral inclination of the roadway, the wheels being arranged on different sides of the vehicle. If the current direction of travel of the vehicle refers to the direction "in front", the two wheels can be arranged one on the right and one on the left side of the vehicle. This has the result that one of the wheels lies closer to the center of the curve on the current section of roadway. Accordingly, the other wheel is further away from the center of the curve. If for example the roadway curves to the left, the left wheel lies closer to the current center of the curve. The term center of the curve refers to the center of the circle that is used to adapt to the current section of roadway. The current wheel velocities can be measured using different sensors, the wheel velocities being respectively recorded for each wheel, i.e. individually. The wheel velocities are preferably determined on rigid, i.e. non-steerable, wheels of the vehicle of one axle. However, it is also possible to use a comparison of the velocities of steerable wheels and also steerable wheels on different axles, the mathematical correction of the measured wheel velocities for obtaining the comparable velocities of the wheels of only one axle being known to a person skilled in the art.

In method step c), the current radius of lateral inclination Q of the roadway is calculated on the basis of the current wheel velocity v(1), the wheel distance d and the difference between the wheel velocities measured in method step b). The current radius of lateral inclination Q of the roadway is obtained from the extension of the distance between the two wheels toward the current center of the curve and is shown by way of example at the back of the figures. The radius of lateral inclination is defined as the radius of a circle that extends from the current center of the curve on the roadway to the nearest wheel, the distance between the center of the curve and the nearest wheel extending in a straight line through the other wheel used for measurement. The velocity of the wheel that lies closer to the current center of the curve is therefore used as a factor for calculating the current radius of lateral inclination of the roadway in m. Furthermore, the difference in the wheel velocities of the right side and the left side of the vehicle is included in the calculation. For example, for a roadway that curves to the left, this can be obtained from the difference between the velocity of the right wheel and the velocity of the left wheel. The wheel distance d refers here to the distance in m between the two wheels used for the measurement, the difference between the respective wheel distance and the center point of the curve being used in cases where the wheels are not on the same axis. In a preferred embodiment, the vehicle width can also be used for this factor. Based on the fact that the vehicle width is in many cases significantly smaller compared to the radius of curvature of the roadway, the resulting inaccuracy can be ignored.

In method step d), the current angle of inclination a of the roadway is calculated using the quotient of the radius of curvature K determined in method step a) and the current radius of lateral inclination Q calculated in step c). From the current radius of curvature K of the roadway and the current radius of lateral inclination Q, the current angle of inclination of the roadway can be determined as a function of the quotient (K/Q). The angle is thus obtained mathematically from the quotient, it also being possible to use further mathematical functions for the final determination of the angle on the basis of the quotient.

In a preferred embodiment of the method, the current radius of lateral inclination Q of the roadway can be determined in method step c) using the following formula I:

$$Q = \frac{v(1) * d}{v(2) - v(1)}$$

The current radius of lateral inclination can thus advantageously be obtained as the quotient of the product of the velocity of the wheel lying closer to the center of the curve multiplied by the wheel distance as the numerator and the difference between the different wheel velocities as the denominator. The current radius of lateral inclination in m is thereby obtained.

In a further embodiment of the method according to the invention, the current angle of inclination α of the roadway can be determined in method step d) using the following formula II:

$$\alpha(t) = \arccos\left(\frac{K}{Q}\right)$$

The current angle of inclination can be obtained on the basis of the above formula via the arc cosine, i.e. from the inverse function of the cosine, the quotient of the current radius of curvature of the roadway and the current radius of lateral inclination Q. The angle of lateral inclination is in this case given in radians. It has been found to be advantageous to use this function as an approximation for calculating the angle of inclination, since in many cases the vehicle width is small compared to the radius of lateral inclination Q. More exact results can therefore be obtained from the calculation with the sum of the radius of lateral inclination and the vehicle width in the denominator.

In a further preferred embodiment of the method, the velocities of wheels of one vehicle axle can be measured in method step b). To simplify the calculation and to obtain particularly precise results for the angle of inclination, it has been found to be particularly advantageous that the wheel velocities on wheels of only one vehicle axle are used. For example, the velocities of the front right wheel and front left wheel or optionally the corresponding rear wheels may be used for the determination. The wheel velocities of non-steerable wheels on one vehicle axle (front, rear) may preferably be used for the calculation. This can simplify the calculation, reduce the number of sources of error and thus increase the speed and precision of the method according to the invention. However, it is also possible to include the velocities of wheels of different axles and also steerable wheels, the measured velocities then being corrected for example via the steering angles. The corresponding corrections for steerable wheels and wheels on different axles are known to a person skilled in the art.

In a further preferred aspect of the method, the velocities measured in method step b) can be adjusted as a function of the tire pressure of the respective wheel. To obtain a particularly accurate angle of inclination, it has been found to be particularly advantageous that the currently measured wheel velocities are related back to a uniform tire pressure. Through this normalization, more comparable velocities of the different wheels are obtained, which can contribute to a particularly high degree of precision in determining the angle of inclination.

In a preferred embodiment of the method, method steps b)-d) may only be carried out in those cases in which in method step a) the current radius of curvature K of the roadway is greater than or equal to 3000 m. To increase the efficiency of the method, it has therefore been found to be particularly advantageous that the method steps are only carried out in those cases in which the current section of roadway has a certain minimum curvature with a correspondingly large radius. If the current radius of curvature is below the specified limit value, the road is "too" straight and usually there are only extremely small angles of inclination on such straight roadways. In this respect, the present method can be particularly suitable for regions with tight curves, in which an exact determination of the angle of inclination is particularly important on account of the prevailing driving dynamics.

Within a further preferred embodiment of the method, the current radius of curvature K of the roadway may be determined in method step a) from GPS or camera data. The methods mentioned above have proven to be particularly quick and reliable for determining a sufficiently accurate radius of curvature of the roadway that is related to the current vehicle position. The GPS data can be used for example to access radii of curvature of the specifically applicable roadway position that are stored in tabular form. In the case of a camera-based detection of the radius of curvature, the roadway ahead may for example be optically detected and the positionally accurate radii of curvature calculated at the current time from the course of the roadway. Once the vehicle has arrived at this point, currently usable data on the radius of curvature are available. The latter can depict the current driving situation in a particularly up-to-date manner.

Also according to the invention is the use of the method according to the invention as part of a routine for monitoring and/or controlling a vehicle. The current angle of lateral inclination of a roadway is an important parameter that can have a significant influence on the driving dynamics of vehicles, in particular at high velocities and on tight curves. In this respect, because they are up to date and accurate, the data of the method according to the invention can contribute to allowing other safety and control systems that are present in the car to access more up-to-date and more accurate data, which of course optimizes the automatic control processes. All in all, quicker and more correct decisions can therefore be made, which increases the safety of the vehicle and that of other road users. Furthermore, compared to the prior art, the use according to the invention also allows the lateral angle of the roadway and the vehicle to be calculated on the basis of data which have a much lower noise component. This applies in particular in comparison with acceleration sensors that are used, so that a much higher level of precision and robustness can be achieved on the basis of the low noise of the sensors used.

The invention also concerns a driver assistance system having at least two wheels with velocity sensors, a control unit, a GPS module or a camera, the control unit being in electrical contact with the velocity sensors of the wheels and with the camera or GPS module, and the control unit being set up to carry out the method according to the invention. The method according to the invention is suitable in particular for integration into a driver assistance system, which outputs possible risk potentials to a driver either autonomously or via graphic or acoustic instructions with regard to an unusual angle of lateral inclination of the roadway or a rapidly changing angle of lateral inclination. Furthermore, the system according to the invention can be used to actively intervene in the driving dynamics of the vehicle, for example by accelerating, braking or steering, so that the risk potential of the driving situation is reduced. In addition to the velocity sensors, the module may also have devices for determining the two-dimensional radius of curvature of the roadway in the form of a camera unit and/or a GPS module, as well as a central control unit, for example an ECU. It is also possible that the driver assistance system also provides the Hall sensors that detect the velocity of individual wheels. Furthermore, the system may also preferably have low-pass filters, which filter the Hall sensor data. A system equipped in this way can contribute to less noisy measurement of the wheel velocities. Furthermore, for the advantages of the driver assistance system, reference is also made explicitly to the aforementioned advantages of the method according to the invention. Also coming into consideration as a driver assistance system are in particular lane-keeping systems or also steering assistance systems, which can provide greater driving safety and stability by means of the method according to the invention.

In a preferred embodiment of a driver assistance system, the driver assistance system may be a lane-keeping system, in which the control unit is set up to carry out a method in which, on the basis of the current vehicle velocity and an imminent radius of curvature K of the roadway, which is obtained either from GPS data or from camera data, a statement can be made regarding safe driving dynamics of the vehicle. This embodiment can also represent a preferred embodiment of a method. Taking into account the physically acting forces, based on the mathematical description of the centripetal force and simplifying and abbreviating the vehicle weight, the following relationship can be established:

$$V_{current}^2(t) < C_{exp} \cdot k_{fric} \cdot g \cdot K_{following}(t+\Delta t),$$

where in the mathematical relationship $v_{current}$ stands for the current vehicle velocity, $k_{fric}$ for the lateral friction coefficient of the roadway, g for the gravitational acceleration, $K_{following}$ for the radius of curvature K of the roadway directly ahead, t a selected point in time, $\Delta t$ a time interval and $C_{exp}$ an experimental factor for adjusting the results obtained. In particular, $C_{exp}$ can be used to achieve a better fitting of the model to the actual driving dynamics of the vehicle type. This fitting can provide better results than an approach based purely on the dynamic behavior of rigid bodies. This procedural approach means that safely traversing the next curve can only be ensured if the square of the current vehicle velocity is less than the product on the right-hand side of the above relation. Possible time intervals lie for example in the range of 5 seconds, and the time interval may preferably be chosen to be variable as a function of the current velocity. For example, the 5-second time interval may be appropriate for a current velocity of 30 m/s, since the vehicle consequently has about 150 m to react before reaching the next curve. For the sake of simplification, an angle of inclination of 0° may be assumed for the curve ahead, since the actual angle of inclination of the curve is still unknown at this point in time and this value rather represents an unfavorable, upper estimate which, if actually correct, would contribute to a rather more dangerous driving situation. This relationship can thus be used to set a relationship between an allowable velocity and curve angles of inclination, which can be used within a method or a lane-keeping system for automatic braking of the vehicle. In this way, the safety of driving can be increased and, in addition, this embodiment can also be used as a component of autonomous driver assistance systems.

In a preferred embodiment of the driver assistance system, the driver assistance system may be set up to postulate, as a function of the current vehicle velocity $v_{current}$, $k_{fric}$ the lateral friction coefficient of the roadway, g the gravitational acceleration, $K_{following}$ the radius of curvature K of the roadway directly ahead, t a selected point in time, $\Delta t$ a time interval and $C_{exp}$ an experimental factor and according to the following mathematical relationship:

$$V_{current}^2(t) < C_{exp} \cdot k_{fric} \cdot g \cdot K_{following}(t+\Delta t),$$

an estimate of the safety of traversing the next curve at the current vehicle velocity and, in cases where the square of the vehicle velocity is greater than the right-hand part of the mathematical relationship, issue a warning to the driver or reduce the velocity of the vehicle.

The invention similarly concerns a vehicle having a driver assistance system according to the invention. With respect to the advantages of a vehicle according to the invention with a driver assistance system according to the invention, reference is made in particular to the advantages of the method according to the invention.

Further advantages and advantageous embodiments of the subject matter according to the invention are illustrated by the drawings and explained in the following description. It should be noted here that the drawings merely have a descriptive character and are not intended to restrict the invention in any way.

Figure 2:
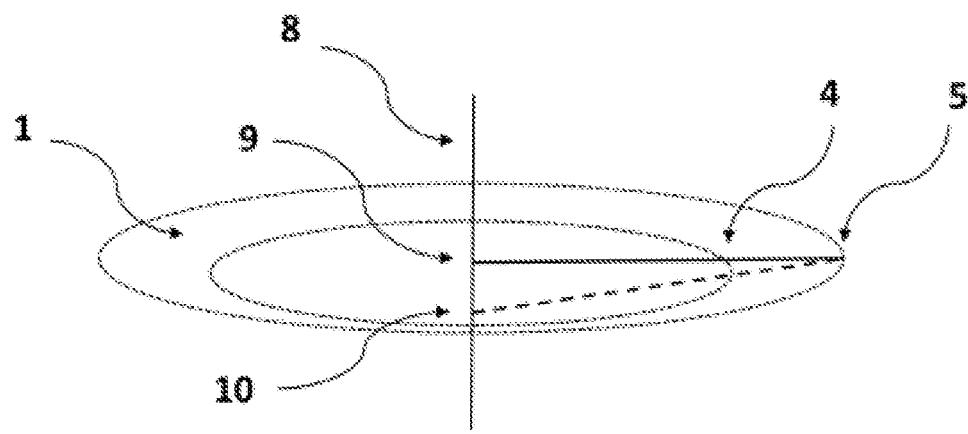
Figure 3:
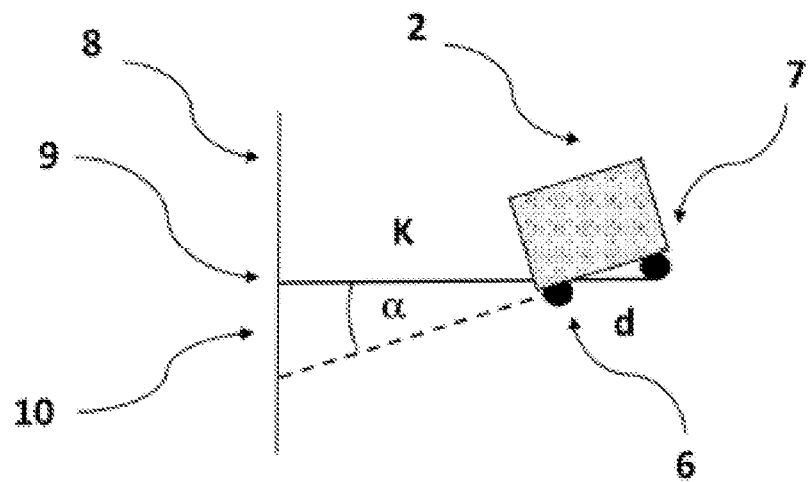
Figure 4:
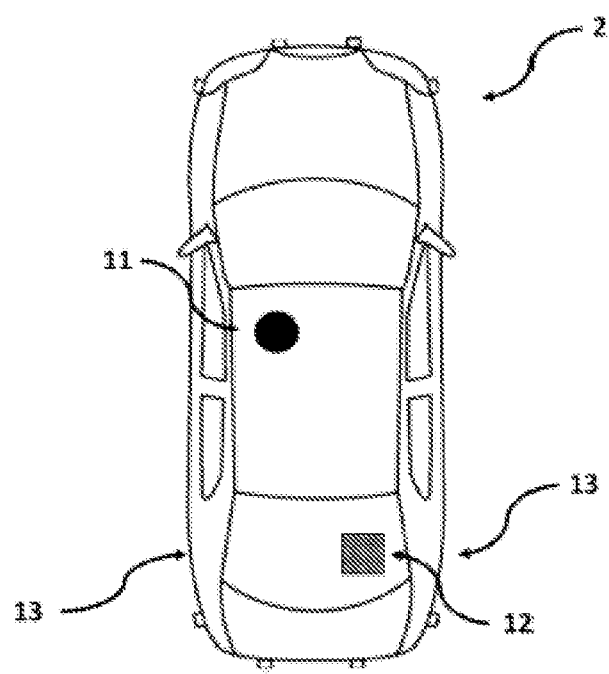

In the drawings:

FIG. 1 schematically shows a representation of a vehicle traveling on an inclined and curved roadway;

FIG. 2 schematically shows a representation of the variables used in the method according to the invention;

FIG. 3 schematically shows a representation of the variables used in the method according to the invention;

FIG. 4 schematically shows a representation of an embodiment of a system according to the invention.

FIG. 1 schematically shows a driving situation of a vehicle (2) on a roadway (1). The roadway (1) is delimited by the left edge (4) and right edge (5) of the roadway, the edges of the roadway (4, 5) being defined on the basis of the direction of travel of the vehicle (2). In the figure, the rear view of the vehicle (2) is shown schematically. The edges of the roadway (4, 5) are at different heights, so that the vehicle axis of the vehicle (2) is shown inclined. For example, this figure may relate to a movement of a vehicle (2) on a curve to the left, it also being possible for example that only the current section of the roadway is approximated by the circles shown. In this example, the vehicle has two rear wheels (6, 7), the rear wheel (6) lying closer to the center of the curvature of the roadway. The right wheel (7) is further away from the center of the curve to the left. The wheel distance d of the vehicle is obtained from the distance between the right wheel (7) and the left wheel (6).

FIG. 2 shows a roadway situation that is comparable to FIG. 1, the vehicle having been omitted from this illustration for the sake of clarity. The roadway (1) is delimited by the left edge (4) and right edge (5) of the roadway, the edges of the roadway (4, 5) having different heights. The right edge (5) of the roadway is shown higher compared to the left edge (4) of the roadway. The current radius of curvature K of the roadway (1) is obtained from a two-dimensional projection of the roadway (1) and extends from the center of the circle (9) to the right edge of the roadway (5). This distance is also known as the inverse of the curvature. Differences in height of the edges of the roadway are not taken into account in this projection, since it is a purely two-dimensional projection of the current roadway situation. The specific circle fitting that is appropriate for the roadway situation can be obtained, for example, via tabulated values that are stored as a function of the GPS position.

In contrast to the current radius of curvature K of the roadway (1), the radius of lateral inclination Q is obtained from a distance that takes into account the inclination of the roadway (1). The radius of lateral inclination Q of the roadway (1) is obtained in FIG. 2 from the distance (10, 4). Thus, the radius of lateral inclination Q of the roadway (1) differs both in the starting point on the axis of the circle and by the end point at the left edge (4) of the vehicle, which in this example coincides with the left edge (4) of the roadway. In cases where the vehicle is smaller than the roadway (1), the radius of lateral inclination Q is based on an imaginary line through the right wheel (7) and left wheel (6) of the vehicle to the center of the circle (10), the radius of lateral inclination Q only being obtained from the distance from the center of the circle to the wheel closest to the curve, in this case the left wheel (6). Taking into account the gradient of the roadway, there is a different radius, which is all the more different the greater the gradient of the road.

Based on the assumption that the angular velocities of the right wheel (7) and left wheel (6) of the vehicle must be the same, the following relationship is obtained for the current angular velocity $\omega(t)$ of the individual wheels:

$$\omega(t) = \frac{v(1)}{Q} = \frac{v(2)}{Q+d}$$

The current angular velocity is therefore obtained from the current velocity of the left wheel (6) v(1), which must be equal to the angular velocity of the right wheel (7) with the velocity v(2). This equation can be solved on the basis of the radius of lateral inclination Q and gives:

$$Q = \frac{v(1) * d}{v(2) - v(1)}$$

On the basis of this equation, the current angle of inclination $\alpha$ is obtained as $$\alpha = \arccos\left(\frac{K}{Q+d}\right) \approx \arccos\left(\frac{K}{Q}\right)$$

This relationship is obtained on the assumption that the wheel distance d is very small compared to the radius of lateral inclination Q.

FIG. 3 describes the same situation as in FIGS. 1 and 2, the roadway having been omitted for the sake of clarity. The current radius of curvature K of the roadway is obtained from the distance (9, 6), i.e. from the center axis of the circle to the wheel furthest away from the curve, the right wheel (6). The radius of lateral inclination Q is obtained from the distance (10, 7), i.e. from the center axis of the circle to the left wheel (7) of the vehicle. As shown above, the current angle of lateral inclination a of the roadway can be determined from the two variables K and Q.

FIG. 4 schematically shows an embodiment according to the invention of a driver assistance system according to the invention. A vehicle (2) which has rear wheels with Hall sensors (13) is shown. Furthermore, the vehicle (2) has a control unit in the form of an ECU (Electronic Control Unit, 12) and a GPS module (11) or a camera (11). The individual components of the system are at least electrically connected via the control unit (12) and the ECU (12) is set up to perform the required steps of the method according to the invention and to determine the angle of inclination of the roadway (1) using the camera/GPS data and the velocity data of the wheels.

LIST OF REFERENCE SIGNS

1 Roadway
2 Vehicle (rear view)
3 Vehicle axis
4 Left delimitation of the roadway
5 Right delimitation of the roadway
6 Left wheel of the vehicle
7 Right wheel of the vehicle
8 Center of curve
9 Radius of curvature K of the roadway 10 Radius of lateral inclination Q
11 GPS sensor or camera
12 ECU
13 Rear wheel with velocity sensors

The invention claimed is:

1. A method for determining the current angle of lateral inclination α of a roadway by a vehicle, comprising:
   a) determining a current radius of curvature K of the roadway;
   b) measuring current velocities of at least two different wheels of the vehicle, one of the wheels with the velocity lying closer to a current center of the curve on the roadway;
   c) calculating a current radius of lateral inclination Q of the roadway on the basis of the current wheel velocity, a wheel distance and the difference between the wheel velocities measured in method step b);
   d) calculating the current angle of lateral inclination a of the roadway using the quotient of the radius of curvature K determined in method step a) and the current radius of lateral inclination Q calculated in method step c); and
   e) controlling the vehicle based on steps a)-d).

2. The method as claimed in claim 1, the current radius of lateral inclination Q of the roadway being determined in method step c) using the following formula I:

$$Q = \frac{v(1) * d}{v(2) - v(1)}.$$

3. The method as claimed in claim 1, the current angle of inclination α of the roadway being determined in method step d) using the following formula II:

$$\alpha = \arccos\left(\frac{K}{Q}\right).$$

4. The method as claimed in claim 1, the velocities of wheels of one vehicle axle being measured in method step b).

5. The method as claimed in claim 1, the velocities measured in method step b) being adjusted as a function of the tire pressure of the respective wheel.

6. The method as claimed in claim 1, method steps b)-d) only being carried out in those cases in which in method step a) the current radius of curvature K of the roadway is less than or equal to 3000 m.

7. The method as claimed in claim 1, the current radius of curvature K of the roadway being determined in method step a) from GPS or camera data.

8. A driver assistance system for a vehicle, comprising:
   at least two wheels with velocity sensors;
   a control unit; and
   a GPS module or a camera,
   the control unit being in electrical contact with the velocity sensors of the wheels and with the camera or GPS module, and
   the control unit being set up to carry out the method as claimed in claim 1.

9. The driver assistance system as claimed in claim 8, the driver assistance system being set up to postulate, as a function of the current vehicle velocity $V_{current}$, $k_{fric}$ a lateral friction coefficient of the roadway, a gravitational acceleration g, $K_{following}$ the radius of curvature K of the roadway directly ahead, a selected point in time t, Δt a time interval and $C_{exp}$ an experimental factor and according to the following mathematical relationship:

$$V_{current}^2(t) < C_{exp} \cdot k_{fric} \cdot g \cdot K_{following}(t+\Delta t),$$

an estimate of the safety of traversing the next curve at the current vehicle velocity and, in cases where the square of the vehicle velocity is greater than the right-hand part of the mathematical relationship, issue a warning to the driver or reduce the velocity of the vehicle.

10. A vehicle with a driver assistance system as claimed in claim 8.

* * * * *